United States Patent
Vetters et al.

(10) Patent No.: US 10,605,103 B2
(45) Date of Patent: Mar. 31, 2020

(54) CMC AIRFOIL ASSEMBLY

(71) Applicants: Rolls-Royce Corporation, Indianapolis, IN (US); Rolls-Royce plc, London (GB)

(72) Inventors: Daniel K. Vetters, Indianapolis, IN (US); Michael J. Whittle, Derby (GB); Eric Koenig, Fishers, IN (US)

(73) Assignees: Rolls-Royce Corporation, Indianapolis, IN (US); Rolls-Royce plc (GB)

(*) Notice: Subject to any disclaimer, the term of this patent is extended or adjusted under 35 U.S.C. 154(b) by 20 days.

(21) Appl. No.: 16/111,793

(22) Filed: Aug. 24, 2018

(65) Prior Publication Data

US 2020/0063581 A1 Feb. 27, 2020

(51) Int. Cl.
*F01D 9/04* (2006.01)
*F01D 25/00* (2006.01)

(52) U.S. Cl.
CPC .............. *F01D 9/042* (2013.01); *F01D 9/041* (2013.01); *F01D 25/005* (2013.01); *F05D 2220/32* (2013.01); *F05D 2240/12* (2013.01); *F05D 2260/201* (2013.01); *F05D 2300/6033* (2013.01)

(58) Field of Classification Search
CPC ........ F01D 9/042; F01D 9/041; F01D 25/005; F05D 2300/6033; F05D 2220/32; F05D 2240/12; F05D 2260/201
See application file for complete search history.

(56) References Cited

U.S. PATENT DOCUMENTS

| | | | |
|---|---|---|---|
| 4,285,634 A | 8/1981 | Rossman et al. | |
| 4,563,125 A | 1/1986 | Boudigues et al. | |
| 6,200,092 B1 | 3/2001 | Koschier | |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 7,410,342 B2 | 8/2008 | Matheny | |
| 7,762,766 B2 | 7/2010 | Shteyman et al. | |
| 7,789,621 B2 | 9/2010 | Dierksmeier et al. | |
| 8,033,790 B2 | 10/2011 | Vance | |
| 8,206,098 B2 | 6/2012 | Prill et al. | |
| 8,210,803 B2 | 7/2012 | Schaff et al. | |
| 8,454,303 B2 | 6/2013 | Garcia-Crespo | |
| 8,475,132 B2 | 7/2013 | Zhang et al. | |
| 9,097,141 B2 | 8/2015 | Paradis | |
| 9,546,557 B2 | 1/2017 | Grooms, III et al. | |
| 9,915,159 B2 | 3/2018 | Huizenga et al. | |
| 10,072,516 B2 * | 9/2018 | Carr | F01D 25/28 |
| 10,174,627 B2 | 1/2019 | Chang et al. | |
| 2014/0001285 A1 | 1/2014 | Grooms, III et al. | |
| 2014/0255174 A1 | 9/2014 | Duelm et al. | |
| 2015/0003979 A1 | 1/2015 | Willett, Jr. | |
| 2016/0003072 A1 | 1/2016 | Chang et al. | |
| 2016/0177761 A1 | 6/2016 | Huizenga et al. | |
| 2016/0201488 A1 | 7/2016 | Carr et al. | |
| 2016/0290147 A1 | 10/2016 | Weaver | |

(Continued)

*Primary Examiner* — Richard A Edgar
(74) *Attorney, Agent, or Firm* — Barnes & Thornburg LLP

(57) ABSTRACT

A ceramic airfoil system includes a ceramic airfoil shell support by a pair of radially extending pins which penetrate through the shell and connect with a carrier. This pins are disposed at the leading and trailing edges of the airfoil and can be preloaded against the corresponding leading and trailing edge walls to manage thermal growth rates.

20 Claims, 3 Drawing Sheets

(56) References Cited

U.S. PATENT DOCUMENTS

| | | |
|---|---|---|
| 2016/0348528 A1 | 12/2016 | Vetters et al. |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |

\* cited by examiner

CMC AIRFOIL ASSEMBLY

BACKGROUND

The present disclosure relates generally to component for turbomachinery, and more specifically to components for turbomachinery such as gas turbine engines.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines, can be advantageously endured by ceramic materials. However, supporting ceramic materials can create challenges including challenges related to different thermal growth rates.

SUMMARY

The present disclosure may comprise one or more of the following features and combinations thereof.

According to one aspect of the present disclosure, an airfoil assembly of a gas turbine engine may include a ceramic airfoil including a pair of endwalls defining the radial gas flow path extent and an airfoil body projecting radially between the endwalls, the airfoil body including an airfoil wall defining an internal cavity portion extending radially and communicating through each endwall. The airfoil wall may include a leading edge wall section defining a leading edge portion of the internal cavity portion and a trailing edge wall section defining a trailing edge portion of the internal cavity portion. The airfoil assembly may include a support carrier including inner and outer portions, the inner and outer portions supporting the ceramic airfoil and each defining a pair of receivers. The airfoil assembly may include a pair of pins for supporting the ceramic airfoil, each pin extending radially through the internal cavity portion of the airfoil body and connecting on each end with one of the receivers of each of the inner and outer portions. A leading pin of the pair of pins may be engaged with the leading edge wall section and a trailing pin of the pair of pins may be engaged with the trailing edge wall section.

In some embodiments, at least one of the pair of pins is a spiral rolled pin. The spiral rolled pin may be adapted to apply a preload to the ceramic airfoil at installation temperatures. The leading pin may be a spiral rolled pin and may be configured to apply a preload to the leading edge wall section at installation temperatures. The trailing pin may be a spiral rolled pin and may be configured to apply a preload to the trailing edge wall section at installation temperatures.

In some embodiments, the leading edge wall section and the leading pin may have complimentary but different curvatures. The leading edge wall section may have smaller radius of curvature than the leading pin and an impingement air flow path may be formed between the leading edge wall and the leading pin. The trailing edge wall section and the trailing pin may have complimentary but different curvature.

In some embodiments, the trailing edge wall section may have smaller radius of curvature than the trailing pin and an impingement air flow path may be formed between the trailing edge wall and the trailing pin. In some embodiments, at least one of the pair of pins may be a solid pin. The solid pin may be a hollow tube.

In some embodiments, the support carrier may include a mast extending between the inner and outer portions. The internal cavity portion may be a single cavity extending radially through the ceramic airfoil.

According to another aspect of the present disclosure, a gas turbine vane may include an airfoil vane including a vane body extending between a pair of endwalls, the vane body including an vane wall defining an internal opening portion extending radially and communicating through each endwall. The airfoil wall may include a leading edge wall having an internal side of a leading edge of the vane body and a trailing edge wall having an internal side of a trailing edge of the vane body. The internal sides may define portions of the internal opening portion. The gas turbine vane may include a support carrier including inner and outer portions. The inner and outer portions may support the airfoil vane and may each define a number of receivers. The gas turbine vane may include a pair of pins extending radially through the internal opening portion for supporting the ceramic airfoil. Each pin of the airfoil body may connect on radial ends with the inner and outer portions of the support carrier. A leading pin of the pair of pins may be engaged with the leading edge wall and a trailing pin of the pair of pins may be engaged with the trailing edge wall.

In some embodiments, at least one of the pair of pins may be a spiral rolled pin. The spiral rolled pin may be adapted to apply a preload against the airfoil vane at installation temperatures. The leading pin may be a spiral rolled pin and may be configured to apply a preload against the leading edge wall at installation temperatures.

In some embodiments, the trailing pin may be a spiral rolled pin and may be configured to apply a preload against the trailing edge wall at installation temperatures. The leading edge wall and the leading pin have complimentary but different curvatures. The leading edge wall may have smaller radius of curvature than the leading pin and an impingement air flow path may be formed between the leading edge wall and the leading pin.

In some embodiments, the trailing edge wall section and the trailing pin may have complimentary but different curvatures. The trailing edge wall may have smaller radius of curvature than the trailing pin and an impingement air flow path may be formed between the trailing edge wall and the trailing pin.

In some embodiments, wherein at least one of the pair of pins is a solid pin. The solid pin may be a hollow tube. In some embodiments, the support carrier may include a mast extending between the inner and outer portions. The internal opening portion may have a single cavity extending radially through the airfoil vane.

These and other features of the present disclosure will become more apparent from the following description of the illustrative embodiments.

DETAILED DESCRIPTION OF THE DRAWINGS

Figure 1:
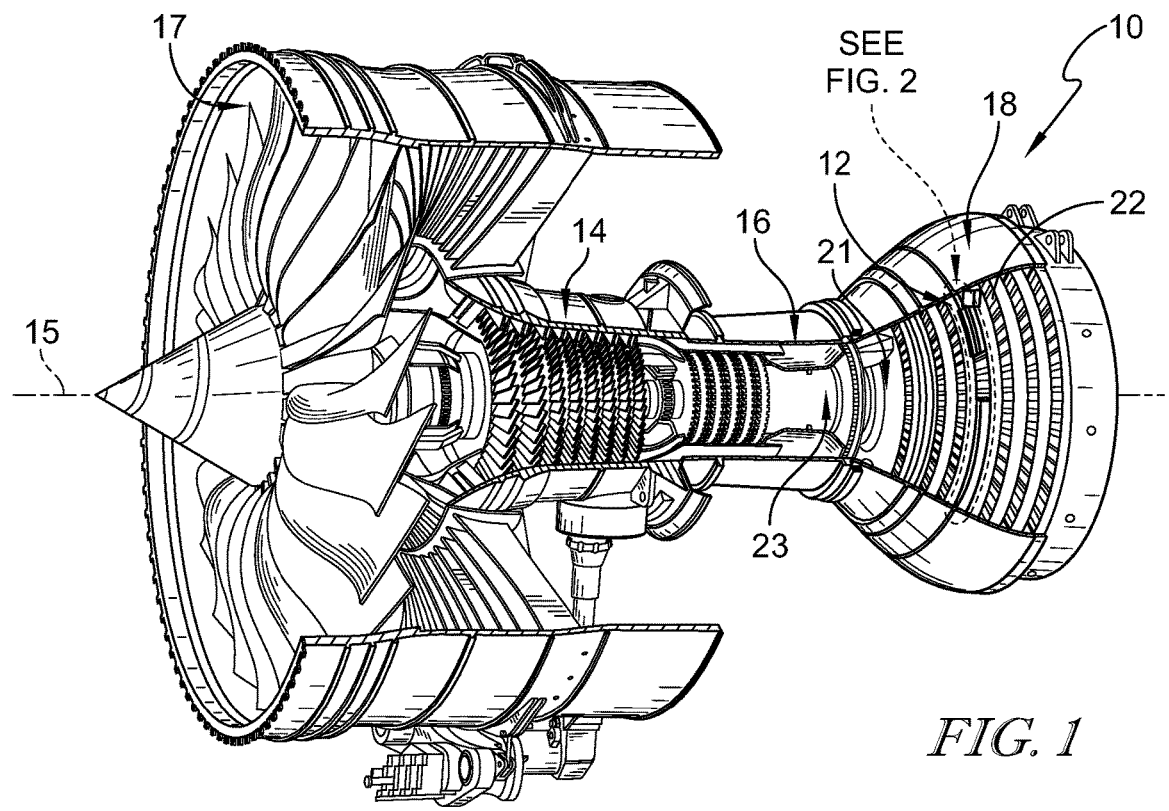
FIG. 1 is perspective view of a gas turbine engine having a portion cutaway to reveal certain internals including a ceramic airfoil assembly of the turbine section for guiding hot, high pressure exhaust flow to expand across turbine blades to rotate a rotor.

For the purposes of promoting an understanding of the principles of the disclosure, reference will now be made to a number of illustrative embodiments illustrated in the drawings and specific language will be used to describe the same.

Ceramic materials, including ceramic matrix composites (CMC), can provide advantages to gas turbine engine operation. For example, CMCs can offer excellent performance at high temperatures while maintaining lower weight than many other materials. Yet, supporting CMCs in adapted uses for engagement with high temperature exhaust flow can present challenges. For example, interfacing such CMC materials with supporting structures made from metallics can be challenging due to differences in thermal growth.

An illustrative airfoil assembly 12 including ceramic materials in adapted use in the gas turbine engine 10 is shown in FIG. 1. The gas turbine engine 10 includes a compressor 14 which compresses air for combustion. The compressed air is mixed with fuel and combusted within a combustor 16 to produce high temperature exhaust flow. The gas turbine engine 10 includes a turbine section 18 arranged to receive and expand the high temperature exhaust flow across its blades 22 to drive a rotor 21 and shaft 23 to provide rotational energy to the compressor 14 and a fan 17 for rotation about a rotational axis 15. The airfoil assembly 12 is embodied as a turbine vane assembly engaging with the high temperature exhaust flow to guide the flow within the turbine section 18.

Figure 2A:
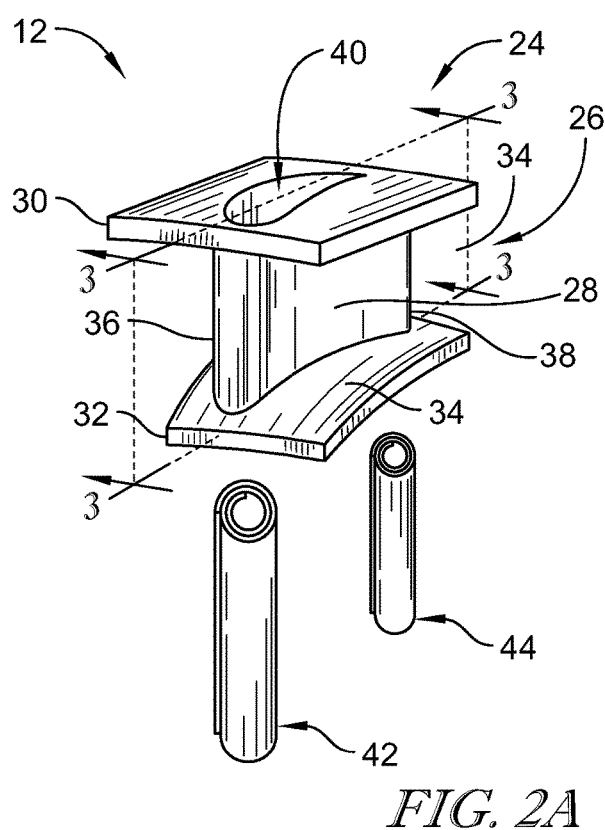
FIGS. 2A and 2B are perspective exploded views of portions of the collective airfoil assembly of FIG. 1 showing in FIG. 2A an ceramic airfoil shell and a number of metallic pins, including a leading and trailing pin, for extension through the shell, and in FIG. 2B a metallic carrier including inner and outer portions having receivers for engaging the pins to support the shell and showing that the carrier includes a mast extending between the inner and outer portions and positioned between the receivers of each inner and outer portion.

As shown in FIG. 2A, the airfoil assembly 12 comprises an airfoil shell 24 including a body 26 defining an airfoil shape by its exterior surface 28 for guiding high temperature exhaust flow through the gas turbine engine 10. The airfoil shell 24 is formed of ceramic matrix composite materials, for example, silicon carbide (SiC) fiber reinforced matrix. The airfoil shell 24 includes endwalls 30,32 connected on either radial end of the body 26 to define radial flow path boundaries according to their radial end surfaces 34. The airfoil body 26 of the illustrative airfoil assembly 12 extends radially (up and down in FIG. 2A) between the endwalls 30,32 and includes a leading edge 36 disposed upstream and trailing edge 38 disposed downstream. An internal cavity 40 is defined through the body 26 communicating through the endwalls 30,32.

The airfoil assembly 12 illustratively includes a pair of pins 42, 44 for positioning to extend through the cavity 40 to support the shell 24. The pair of pins 42, 44 include a leading pin 42 arranged near the leading edge 36 and a trailing pin 44 arranged near the trailing edge 38. The pins 42, 44 illustratively extend through the cavity 40 and radially through each of the endwalls 30,32.

Figure 2B:
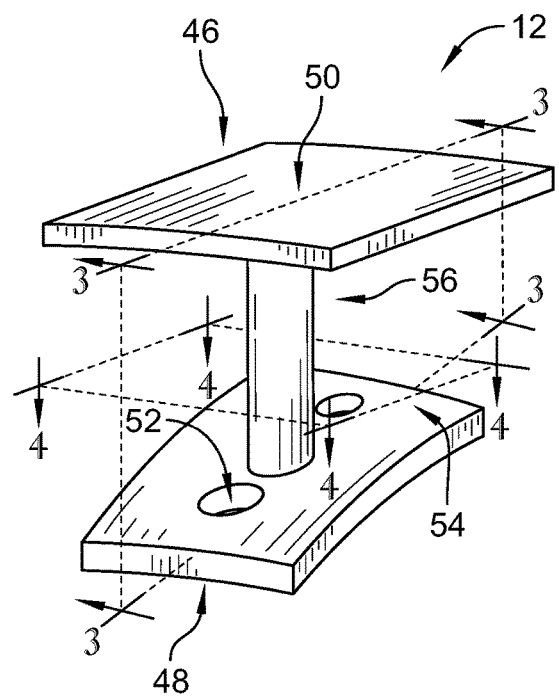

Also as seen in FIG. 2B, the airfoil assembly 12 includes a metallic carrier system 46 for supporting the airfoil shell 24. The carrier system 46 includes an inner wall 48 and an outer wall 50 each arranged to engage the pair of pins 42,44. Each of the inner and outer walls 48,50 include a pair of receivers 52, 54 for connection with the pins 42,44. The carrier system 46 illustratively includes a mast 56 extending between the inner and outer walls 48, 50 and arranged between the receivers 52,54 of each of the inner and outer walls 48, 50. The mast 56 extends through the cavity 40 in the assembled state of the assembly 12.

Figure 3:
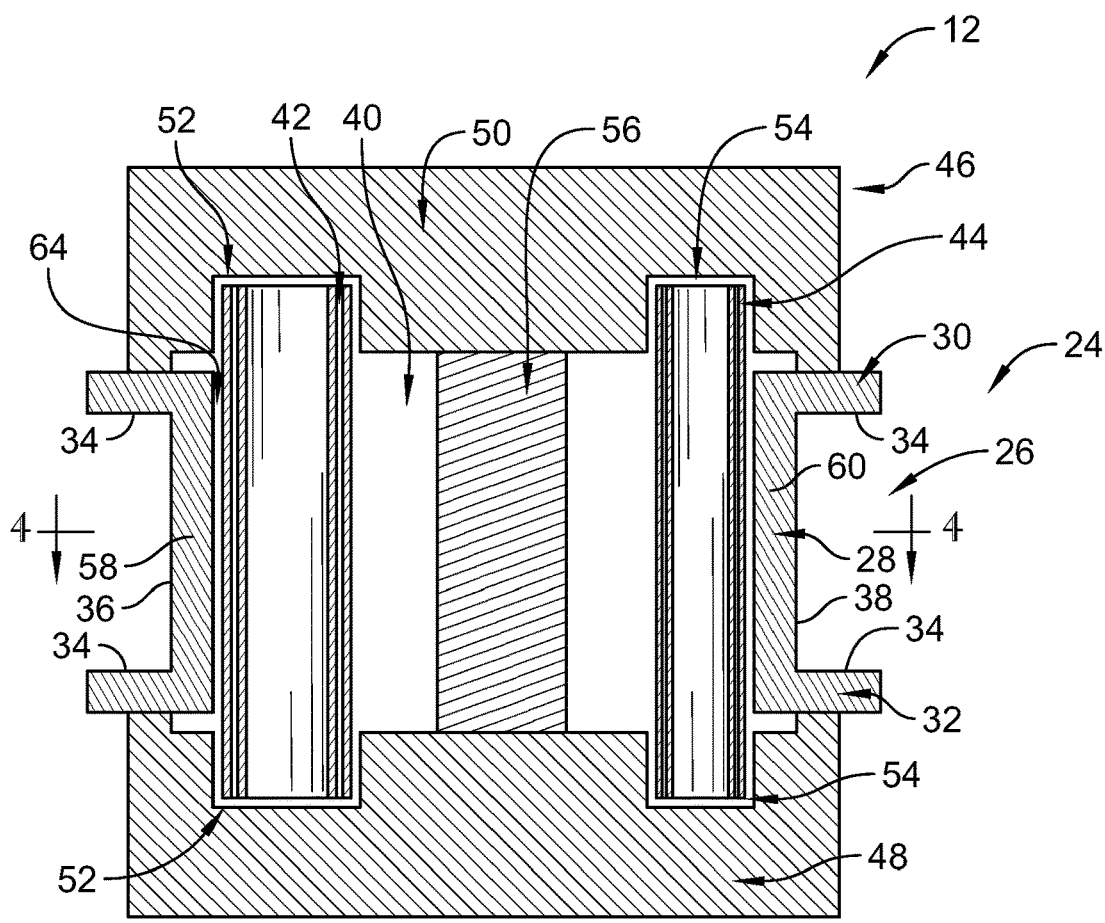
FIG. 3 is a cross-sectional view taken along the collective planes 3-3 of FIGS. 2A and 2B in an assembled state of the airfoil assembly of FIG. 1 showing that the leading pin engages with a leading edge wall and the trailing pin engages with the trailing edge wall to support the shell.

As shown in the cross-section of FIG. 3, the assembled state of the airfoil assembly 12 is shown. The pins 42,44 are received within the respective receivers 52,54 and extend through the cavity 40. The leading edge 36 of the airfoil body 26 is formed by a leading edge wall 58 and the trailing edge 38 is formed by a trailing edge wall 60. The pins 42, 44 support the shell 24 by engagement with the corresponding edge wall 58, 60.

Figure 4:
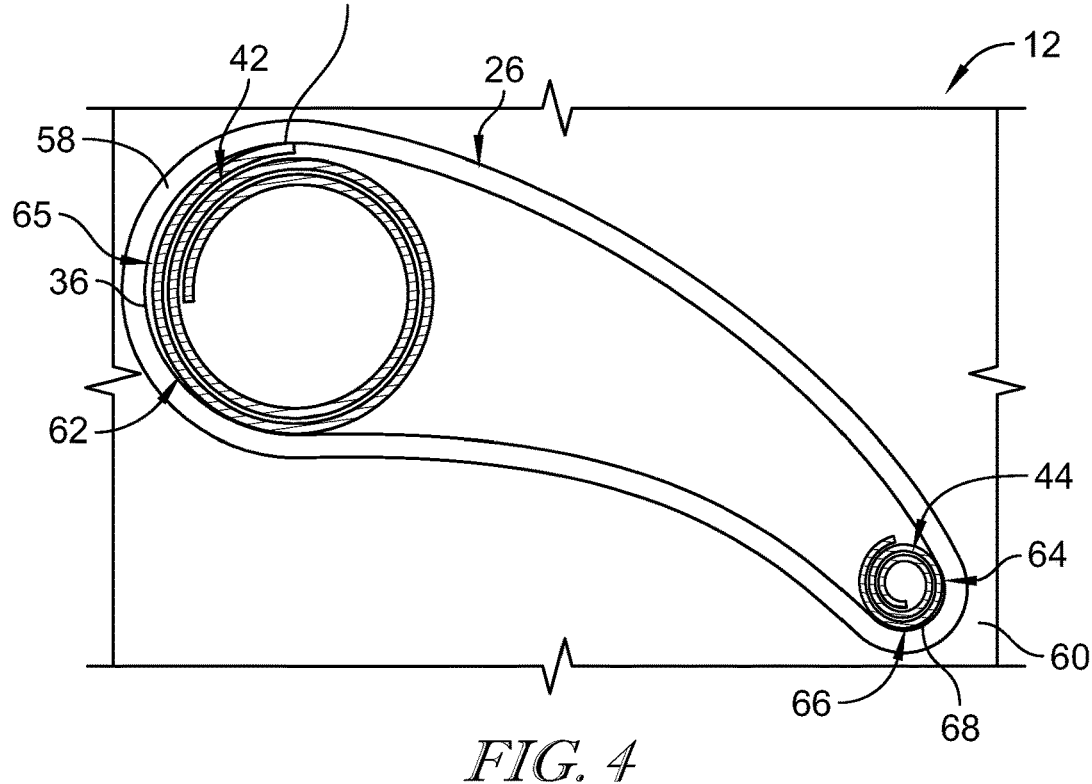
FIG. 4 is a cross-sectional view taken along the collective planes 4-4 of FIGS. 2A and 2B and the line 4-4 of FIG. 3 (while omitting its own cross-section) showing that the pins are spiral rolled pins providing a resilient engagement with the corresponding edge walls, and showing that the curvature of the edge wall at the leading and trailing edges is slightly larger than the curvature of the corresponding pin to allow two contact locations and to define a gap between the contact locations and between the corresponding pin and the edge wall through which impingement air can pass for cooling.

As shown in FIG. 4, the leading pin 42 engages the leading edge wall 58 at two contact locations 61, 62. The curvature of the leading edge wall 58 at the pin 42 is smaller than the outer diameter of the pin 42 to provide the contact locations 61,62 while defining a gap 65 between the pin 42 and the leading edge wall 58 between the contact locations 61,62 near the leading edge 36. Similarly, the trailing pin 44 engages the trailing edge wall 60 at two contact locations 64, 66. The curvature of the trailing edge wall 60 at the pin 44 is smaller than the outer diameter of the pin 44 to provide the contact locations 64,66 while defining a gap 68 between the pin 44 and the trailing edge wall 60 between the contact locations 64,66 near the trailing edge 38. Impingement air can be provided through the gaps 65, 68 to cool the edge walls 58, 60 and the pins 42, 44.

The engagement of the pins 42,44 with their corresponding edge walls 58, 60 provides support to the airfoil shell 24. In use, the high temperature exhaust flow engaging the airfoil shell 24 will increase the temperatures of the airfoil assembly components. The CMC materials of the airfoil shell 24 insulate the internal components but ultimately can exhibit different thermal growth rates across the range of temperatures in use. Accordingly, in order to provide appropriate support to the shell 24 throughout various operating circumstances, the pins 42,44 are embodied to be installed having a predetermined amount of preloading against their corresponding edge wall 58, 60.

In the illustrative embodiment, the pins 42, 44 are formed as metallic spiral rolled pins and preloading against their edge walls 58, 60 is embodied as a compressed state of the rolled pins along radially to their rolled axis. Accordingly, the spring force of the rolled pins to expand their circumference provides a preload outwardly on the corresponding edge walls 58, 60 at installation temperatures (e.g., near standard temperature and pressure, when the gas turbine engine is not in use and is substantially cooled down). As the temperature of each of the shell 24 and the carrier system 46 increases, their growth rates different based on their materials. Thus, the edge walls 58, 60 can grow outwardly away from the pins 42, 44 (i.e., leftward in FIG. 3 for the leading edge wall 58 and rightward for the trailing edge wall 60). The spiral rolled pins 42, 44 can continue to apply load to the edge walls 58, 60 by springing toward the growth direction (outward) to continue supporting the shell 24.

The contact locations 61, 62, 64, 66 are illustratively embodied as providing line contact between the pins 42,44 and the edge walls 58,60 along the entire radial extent of the edge walls 58, 60. In some embodiments, the edge walls 58, 60 may include contact load pads to define one or specific contact points at the contact locations 61, 62, 64, 66.

Figure 5:
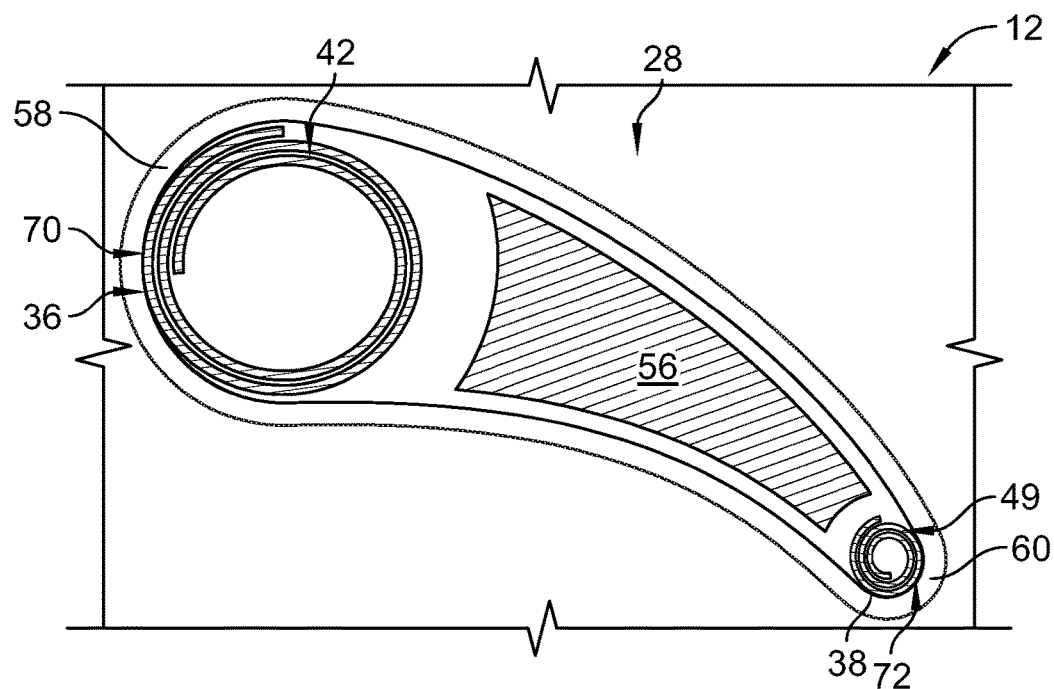
FIG. 5 is a similar cross-sectional view as shown in FIG. 4 of another configuration of the airfoil assembly showing that the pins have a single contact location with the corresponding edge wall.

Referring now to FIG. 5, another configuration of the engagement between the pins 42,44 and the edge walls 58,60 is shown. Specifically, the pins 42, 44 engage with the edge walls 58, 60 at only a single contact location 70 as opposed to multiple locations. The single contact locations 70, 72 for each pin 42,44 are illustratively formed by curvature of the edge walls 58, 60 being large in diameter than the pins 42, 44. The single contact locations 70, 72 can provide a simple engagement between the pins 42,44 and edge walls 58,60.

Figure 6:
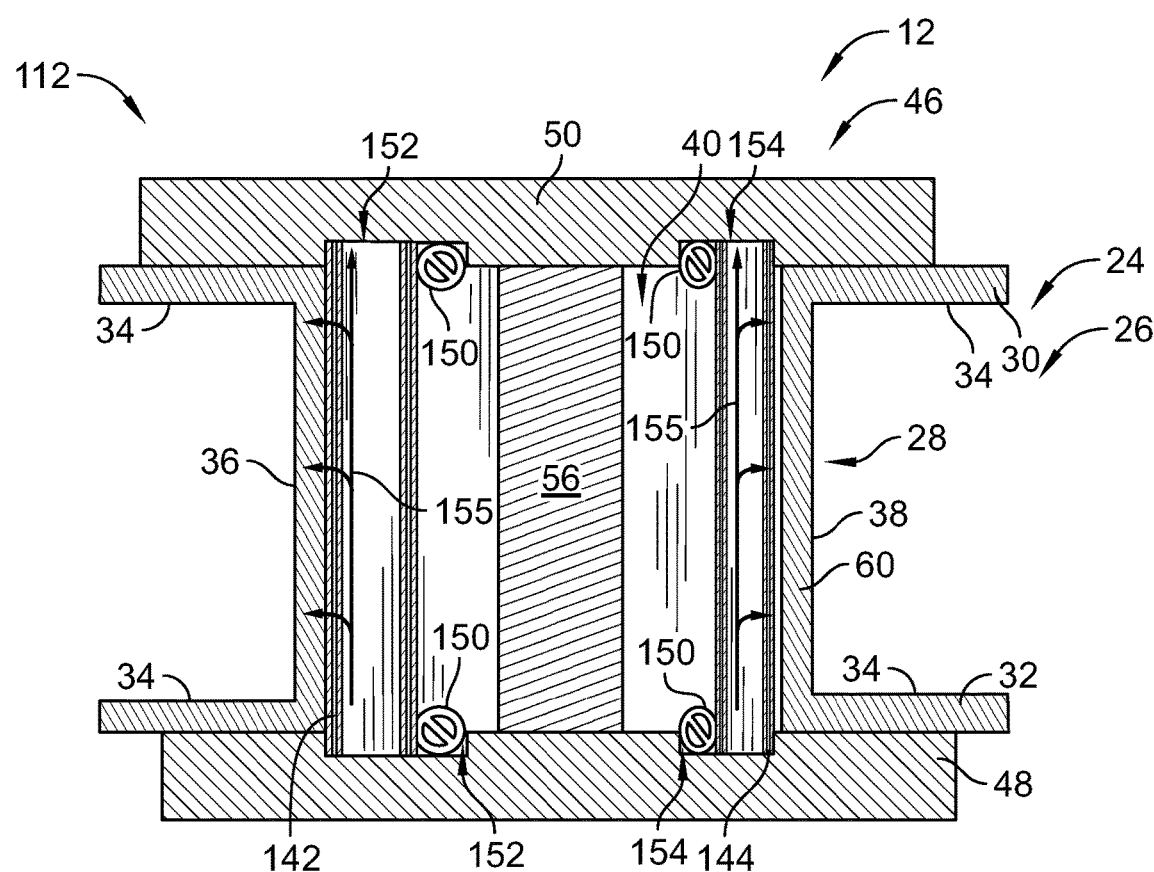
FIG. 6 is a cross-sectional view similar to FIG. 3 of another embodiment of an airfoil assembly showing that the pins are hollow solid pins biased against the corresponding edge walls by biasing devices, and showing that the pins include impingement holes for receiving impingement air through their hollow centers and through the impingement holes for cooling.

Referring now to FIG. 6, another embodiment of an airfoil assembly 112 is shown for use in the gas turbine engine 10. The airfoil assembly 112 is similar to the airfoil assembly 12 and the disclosure of airfoil assembly 12 applies equally to the airfoil assembly 112, except in instances of conflict with the disclosure of airfoil assembly 112. The airfoil assembly 112 includes pins 142, 144 embodied as metallic hollow solid (non-rolled) pins.

The pins 142, 144 extend for connection with the receivers 152, 154 of the inner and outer walls 48, 50 of the carrier system 46 and support the shell 24. The pins 142, 144 are biased against the corresponding edge walls 58, 60 by biasing members 150. Biasing members 150 are illustratively embodied as mechanical springs, e.g., spiral springs, arranged within the receivers 152, 154, but in some embodiments, the biasing members 150 may include any suitable resilient arrangement to bias the pins 142, 144 against the corresponding edge wall 58, 60, for example, wave springs, arc springs, belleville springs, gas spring, volute springs, and/or the like. In some embodiments, the biasing members 150 at the trailing edge pin 144 may be arranged within the receivers 154 but between the trailing edge pin 144 and the trailing edge wall 60 to bias the pin 144 away from the edge wall 60 at installations temperatures. This alternative configuration may be advantageous in arrangements in which thermal growth would cause the stress to the CMC components to increase with temperature.

As shown in FIG. 6, a flow of impingement air 155 can be passed through the hollow center of the pins 142, 144. The impingement air 115 can be directed out through holes in the pins 142, 144 oriented towards the corresponding edge wall 58, 60 to cool the edge walls 58, 60. In some embodiments, anti-rotation devices (e.g., pins, edged shapes) may be applied between the pins 142, 144 and the receivers 152, 154 to maintain pin orientation. In some embodiments, one of the pins 142, 144 may be fixed in the direction between the leading and trailing edges 36, 38, and the other pin 142, 144 can be biased against the corresponding edge wall 58, 60 for resilient movement under movement of the edge wall 58, 60.

One of the challenges of designing and developing ceramic matrix composite (CMC) vanes is how to mount them and how to transfer loads from the gas turbine gas path surfaces, through the CMC to the surrounding structure. There are a couple reasons this is a distinct challenge with CMCs. For example, CMCs generally have low stress allowables, often about an order of magnitude lower than metals, and coefficients of thermal expansion significantly lower than for many metals. This can lead to relative thermal growth differences which can easily lead to fretting, wear, high frictional loading, etc.

Devices, systems, and methods within the present disclose can provide a compliant means for mounting a CMC airfoil, thereby accommodating relative thermal growth issues and minimizing stress in the CMC. The designs may include two compliant pins extending radially through the vane, one positioned towards the leading edge (LE) and one positioned towards the trailing edge (TE). The compliance (or resilience) can be directed in the radial direction of the pin's radius. The pin compliance can be created in multiple ways, for example, the pins can be radially compliant while stiff in bending, such as a spiral roll pin.

In some embodiments, compliance could be in the pin by making it hollow and/or by slotting the ends which fit within load carrying structures above and below the CMC vane. The compliance could be in the mounting structure such as a cylindrical boss with slots to provide compliance, or a cylindrical receptor for the pin end with a structural connection that allows for flexibility/compliance. In some embodiments, there could be a compressible sleeve around the pin that fits with in the vane or within the supporting bores. This compressible sleeve could be similar to a tolerance ring, wave spring, or a compliant gasket type material, etc.

Contact between the pins and the interior surface of the CMC vane which locates and orients the airfoil and transfers loads to the surrounding structure. The contact may be line contact along the pin or specific load pad contacts with the load pads integral with the vane, integral with the pin, or separate pieces captured in place. Each pin may have a single line of contact or could be "spring" loaded into contact with the CMC vane along two lines of contact (the radius of the pin is larger than the LE/TE radius, thereby contacting on two lines as the pin is loaded into the ends of the interior cavity).

In some embodiments, Hollow pins may conduct air to impingement holes along the LE and/or TE. The pin radius can be larger than the LE/TE such that a space is left in the desired impingement area. Holes through the pin wall would impinge air on the inside of the vane for thermal management. The ends of the pins may include anti-rotation/orientation features to ensure orientation.

CMC can have drastically lower coefficient of thermal expansion (CTE) than metals. Therefore, it is expected that the CMC airfoil would grow less than the surrounding structure during operation. So the preload of the pins against the wall of the CMC vane may be minimal at cold build such that the stress at operating conditions would be managed.

Ideally, the CMC would be allowed to run very hot and the supporting metal structure would be kept fairly cool such that the relative thermal growth is minimized or reversed (CMC airfoil outgrows the metal structure). In at least some embodiments, the pins may be be preloaded against the LE and TE of the CMC vane at cold build so that as the metal supports out grows the CMC airfoil, the preload is reduced, but not fully eliminated. In this way, stress at high operating temperatures due to preload would be minimized, leaving generally only aero load transfer and thermal stresses. This may approach optimization of forces as it would minimize the superposition of stresses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly of a gas turbine engine, the airfoil comprising
    a ceramic airfoil including a pair of endwalls defining the radial gas flow path extent and an airfoil body projecting radially between the endwalls, the airfoil body including an airfoil wall defining an internal cavity portion extending radially and communicating through each endwall, wherein the airfoil wall includes a leading edge wall section defining a leading edge portion of the internal cavity portion and a trailing edge wall section defining a trailing edge portion of the internal cavity portion,
    a support carrier including inner and outer portions, the inner and outer portions supporting the ceramic airfoil and each defining a pair of receivers, and
    a pair of pins for supporting the ceramic airfoil, each pin extending radially through the internal cavity portion of the airfoil body and connecting on each end with one of the receivers of each of the inner and outer portions, wherein a leading pin of the pair of pins is engaged with the leading edge wall section and a trailing pin of the pair of pins is engaged with the trailing edge wall section.

2. The airfoil assembly of claim 1, wherein at least one of the pair of pins is a spiral rolled pin.

3. The airfoil assembly of claim 2, wherein the spiral rolled pin is adapted to apply a preload to the ceramic airfoil at installation temperatures.

4. The airfoil assembly of claim 3, wherein the leading pin is a spiral rolled pin and is configured to apply a preload to the leading edge wall section at installation temperatures.

5. The airfoil assembly of claim 3, wherein the trailing pin is a spiral rolled pin and is configured to apply a preload to the trailing edge wall section at installation temperatures.

6. The airfoil assembly of claim 1, wherein the leading edge wall section and the leading pin have complimentary but different curvatures.

7. The airfoil assembly of claim 6, wherein the leading edge wall section has smaller radius of curvature than the leading pin and an impingement air flow path is formed between the leading edge wall and the leading pin.

8. The airfoil assembly of claim 1, wherein the trailing edge wall section and the trailing pin have complimentary but different curvature.

9. The airfoil assembly of claim 8, wherein the trailing edge wall section has smaller radius of curvature than the trailing pin and an impingement air flow path is formed between the trailing edge wall and the trailing pin.

10. The airfoil assembly of claim 1, wherein at least one of the pair of pins is a solid pin.

11. The airfoil assembly of claim 10, wherein the solid pin is a hollow tube.

12. The airfoil assembly of claim 1, wherein the support carrier includes a mast extending between the inner and outer portions.

13. The airfoil assembly of claim 1, wherein the internal cavity portion is a single cavity extending radially through the ceramic airfoil.

14. A gas turbine vane comprising
    an airfoil vane including a vane body extending between a pair of endwalls, the vane body including an vane wall defining an internal opening portion extending radially and communicating through each endwall, wherein the airfoil wall includes a leading edge wall having an internal side of a leading edge of the vane body and a trailing edge wall having an internal side of a trailing edge of the vane body, the internal sides defining portions of the internal opening portion,
    a support carrier including inner and outer portions, the inner and outer portions supporting the airfoil vane and each defining a number of receivers, and
    a pair of pins extending radially through the internal opening portion for supporting the airfoil vane, each pin of the airfoil body connecting on radial ends with the inner and outer portions of the support carrier, wherein a leading pin of the pair of pins is engaged with the leading edge wall and a trailing pin of the pair of pins is engaged with the trailing edge wall.

15. The airfoil assembly of claim 14, wherein at least one of the pair of pins is a spiral rolled pin.

16. The airfoil assembly of claim 15, wherein the spiral rolled pin is adapted to apply a preload against the airfoil vane at installation temperatures.

17. The airfoil assembly of claim 15, wherein the leading pin is a spiral rolled pin and is configured to apply a preload against the leading edge wall at installation temperatures.

18. The airfoil assembly of claim 15, wherein the trailing pin is a spiral rolled pin and is configured to apply a preload against the trailing edge wall at installation temperatures.

19. The airfoil assembly of claim 14, wherein the leading edge wall and the leading pin have complimentary but different curvatures.

20. The airfoil assembly of claim 19, wherein the leading edge wall has smaller radius of curvature than the leading pin and an impingement air flow path is formed between the leading edge wall and the leading pin.

* * * * *